United States Patent
Alley

(10) Patent No.: US 7,909,378 B2
(45) Date of Patent: Mar. 22, 2011

(54) APPARATUS FOR CARRYING MULTIPLE FISHING POLES

(76) Inventor: Corey James Alley, Madeira Beach, FL (US)

( * ) Notice: Subject to any disclaimer, the term of this patent is extended or adjusted under 35 U.S.C. 154(b) by 917 days.

(21) Appl. No.: 11/767,037

(22) Filed: Jun. 22, 2007

(65) Prior Publication Data

US 2008/0314848 A1 Dec. 25, 2008

(51) Int. Cl.
  *A45F 5/00* (2006.01)
  *A01K 87/00* (2006.01)
  *A01K 97/00* (2006.01)
(52) U.S. Cl. .............................. 294/143; 43/25; 211/70.8
(58) Field of Classification Search .................. 294/143, 294/140, 141, 142; D22/147; 43/21.2, 25, 43/25.2, 26; 248/68.1
  See application file for complete search history.

(56) References Cited

U.S. PATENT DOCUMENTS

| | | | |
|---|---|---|---|
| 3,113,363 A | 12/1963 | Fyvie | |
| 4,628,628 A * | 12/1986 | Burgin et al. | 43/26 |
| 5,072,539 A * | 12/1991 | Greenberg | 43/21.2 |
| 5,297,676 A * | 3/1994 | Coleman | 206/315.11 |
| 5,450,688 A | 9/1995 | Hall | |
| 5,678,348 A * | 10/1997 | Zielinski et al. | 43/26 |
| 6,023,876 A * | 2/2000 | Haddad et al. | 43/25.2 |
| D426,282 S * | 6/2000 | Harmon | D22/147 |
| 6,254,055 B1 | 7/2001 | Lamberson, Jr. | |
| 7,293,746 B2 * | 11/2007 | Brundage | 248/68.1 |
| D582,508 S * | 12/2008 | Alley | D22/147 |
| D586,425 S * | 2/2009 | Alley et al. | D22/147 |

* cited by examiner

*Primary Examiner* — Paul T Chin
(74) *Attorney, Agent, or Firm* — Larson & Larson, P.A.; Frank Liebenow; Justin Miller

(57) ABSTRACT

An apparatus for carrying multiple fishing poles includes a connecting rod with a first end and a distal second end and a first supporting member affixed to the first end of the connecting rod and a second supporting member affixed to the distal end of the connecting rod. A plurality of recesses is in the supporting members, each of the recesses sized to accept one of the fishing poles. A cloth strap is affixed individually to one end of each supporting member and adapted to removably cover the outer circumference of the given supporting member, thereby removably holding the fishing poles within the recesses of each supporting member.

19 Claims, 6 Drawing Sheets

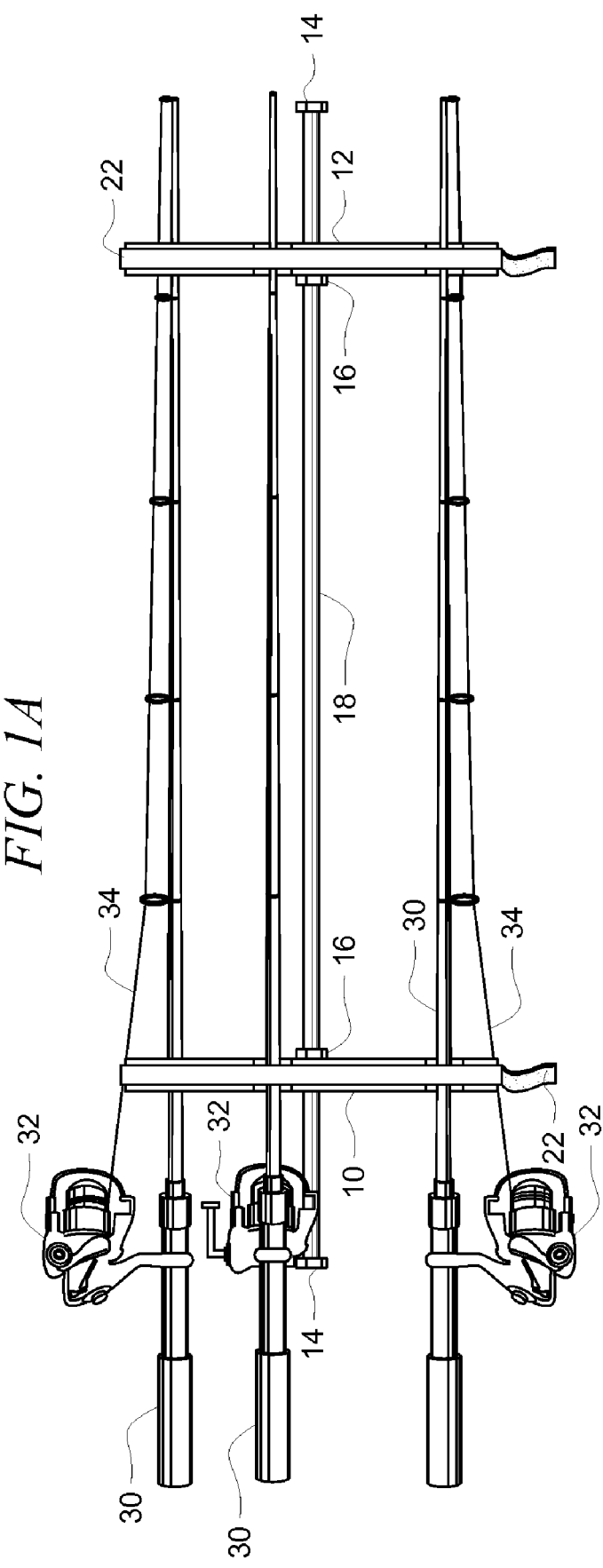

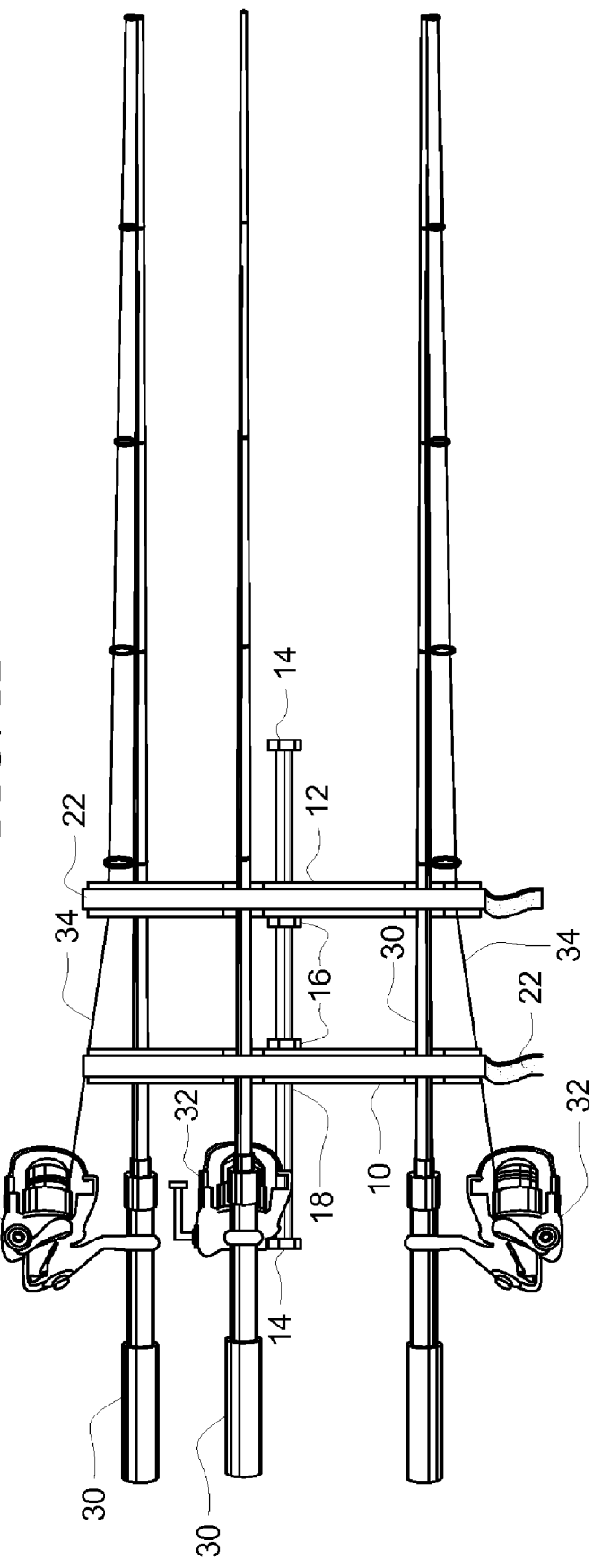

APPARATUS FOR CARRYING MULTIPLE FISHING POLES

FIELD OF THE INVENTION

This invention relates to the field of fishing and more particularly to a device for organizing multiple fishing poles while transporting the same.

BACKGROUND OF THE INVENTION

A fisherman rarely carries one rod and reel to his or her place of fishing. Rather, several rods and reels are carried along with assorted fishing tackle. Carrying multiple rods and reels of varying lengths and diameters is often a difficult task being that each rod tends to go in a different direction.

A solution to this problem is presented in U.S. Pat. No. 3,113,363 to Fyvie. This patent includes disks into which the fishing poles are snapped and held by friction. The disks of this patent need be made to accommodate specific rod diameters. Furthermore, the disks of this patent are not connected to each other and will allow the rods to twist within the disk apertures.

Another solution is presented in U.S. Pat. No. 4,628,628 to Burgin et al. This patent also includes disks with apertures for accepting the rods, but each aperture is also sized to the diameter of the rods and there is no provision to secure the rods into the apertures.

Another solution is presented in U.S. Pat. No. 5,450,688 to Hall. This patent also has disks with apertures for holding the rods but is intended for carrying rods in their two-piece state and has no provision for strapping the rods securely to the disks.

Another solution is presented in U.S. Pat. No. 5,678,348 to Zielinski, et al. This patent has disks with apertures for holding the rods. This patent has retaining straps that encircle the disks to retain the rods, but has no rigid member connecting the disks to each other, thereby allowing the disks to randomly rotate.

Another solution is presented in U.S. Pat. No. 6,471,103 to Frese, et al. This patent has disks with apertures for holding the rods. This patent has a rigid member connecting the disks to each other but does not have a positive way to retain fishing poles of various sizes to the disks.

What is needed is a carrier for multiple fishing poles that will also organize the rods and prevent them from tangling.

SUMMARY OF THE INVENTION

In one embodiment, an apparatus for carrying multiple fishing poles is disclosed including a connecting rod with a first end and a distal second end and a first supporting member affixed to the first end of the connecting rod and a second supporting member affixed to the distal end of the connecting rod. A plurality of recesses is in the supporting members, each of the recesses sized to accept one of the fishing poles. A first cloth strap is affixed at one end to the first supporting member and adapted to removably cover the outer circumference of the first supporting member, thereby removably holding the fishing poles within the recesses of the first supporting member and a second cloth strap is affixed at one end to the second supporting member and adapted to removably cover the outer circumference of the second supporting member, thereby removably holding the fishing poles within the recesses of the second supporting member.

In another embodiment, a method of carrying multiple fishing poles is disclosed including providing an apparatus for carrying multiple fishing poles that has a connecting rod with a first end and a distal second end. A first supporting member is affixed to the first end of the connecting rod and a second supporting member is affixed to the distal end of the connecting rod. A plurality of recesses is formed in the supporting members, each of the recesses sized to accept one of the fishing poles. A first cloth strap is affixed at one end to the first supporting member and adapted to removably cover the outer circumference of the first supporting member, thereby removably holding the fishing poles within the recesses of the first supporting member and a second cloth strap is affixed at one end to the second supporting member and adapted to removably cover the outer circumference of the second supporting member, thereby removably holding the fishing poles within the recesses of the second supporting member. The method continues with placing at least one fishing pole into the recesses of the first supporting member and placing the at least one fishing pole into a corresponding recesses of the second supporting member then affixing the first cloth strap around the first supporting member and affixing the second cloth strap around the second supporting member thereby securing the at least one fishing pole to the first supporting member and the second supporting member. The method completes with carrying the at least one fishing pole by holding one of the at least one fishing poles.

In another embodiment, an apparatus for carrying multiple fishing poles is disclosed including a first device for holding the fishing poles that has a first plurality of recesses on its peripheral surface and has a first device for removably securing the fishing pole into its recesses. A similar device for holding fishing poles has a second plurality of recesses on its peripheral surface and the second device for removably securing the fishing poles into its recesses. The first device for holding the fishing poles is connected to the second device for holding the fishing poles by a rigid support.

BRIEF DESCRIPTION OF THE DRAWINGS

The invention can be best understood by those having ordinary skill in the art by reference to the following detailed description when considered in conjunction with the accompanying drawings in which:

FIG. 1A illustrates a schematic view of a fishing rod holder with multiple fishing poles of a first embodiment of the present invention.

FIG. 1B illustrates a schematic view of a fishing rod holder with multiple fishing poles of a second embodiment of the present invention.

DETAILED DESCRIPTION OF THE INVENTION

Figure 2:
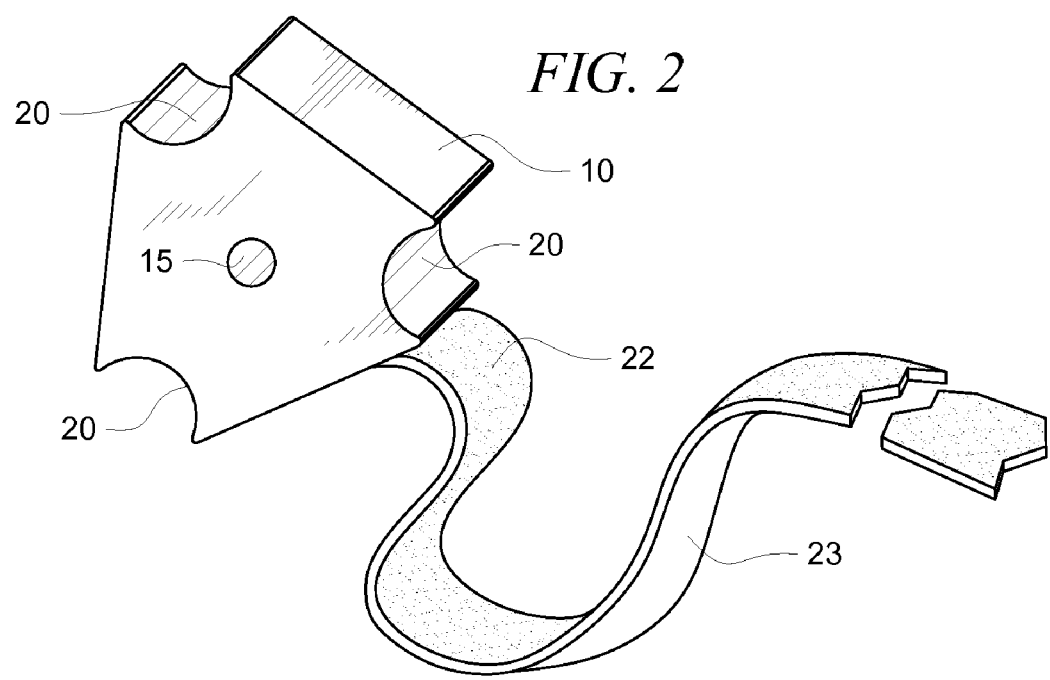
FIG. 2 illustrates an isometric view of a supporting member of all embodiments of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1A, a schematic view of a fishing rod holder with multiple fishing poles of a first embodiment of the present invention will be described. In this embodiment, two supporting members 10/12 are securely held to each other by a connecting rod 18. In some embodiments, the supporting members 10/12 are fastened to the connecting rod 18 at a fixed location. In the example shown, the supporting members 10/12 are restrained on the connecting rod 18 by stops 14/16, allowing an adjustment of the supporting members 10/12 between the first stop 14 and the second stop 16. In this embodiment, if a feature of one of the fishing poles 30 (e.g., a fishing line guide) align with the supporting members 10/12, the supporting members 10/12 are relocatable to a position where the feature no longer interferes with the supporting members 10/12. In the example shown, three fishing poles 30 with reels 32 and fishing line 34 are shown for completeness.

To securely hold the fishing poles 30 to the support members 10/12, a securable band of material 22 removable secures around the circumference of each support member 10/12. In the preferred embodiment, the securable band of material 22 is made from cloth (e.g., nylon). One end of the securable band of material 22 is affixed to the circumference of each support member 10/12 and the loose end of the securable band of material 22 has hook and loop material on its inside surface, adapted to affix the loose end to matching hook and loop material on the outside surface of the securable band of material 22. In alternate embodiments, the loose end of the securable band of material 22 is removably affixed to itself by ways known in the industry including, but not limited to snaps, buckles, buttons and clips.

In some embodiments, the supporting members 10/12 freely slide within a restricted area of the connecting rod 18 while in other embodiments, the supporting members 10/12 are fixed in position on a threaded portion of the connecting rod 18 by fasteners 16 such as nuts. In some embodiments, the supporting members 10/12 freely rotate on the connecting rod 18 while in other embodiments, supporting members 10/12 are kept from rotating on the connecting rod 18.

The connecting rod 18 is made from any suitable stiff material such as steel, wood and hard plastic. The supporting members 10/12 are made from any suitable stiff material such as steel, wood, plastic, metal, etc. In some embodiments, it is preferred that the supporting members 10/12 be made from a stiff, yet slightly flexible plastic such as low density polypropylene (LDPE) and nylon.

Referring to FIG. 1B, a schematic view of a fishing rod holder with multiple fishing poles of a second embodiment of the present invention will be described. In this embodiment, two supporting members 10/12 are securely held to each other by a shortened connecting rod 18. In some embodiments, the supporting members 10/12 are fastened to the connecting rod 18 at a fixed location. In the example shown, the supporting members 10/12 are restrained on the connecting rod 18 by stops 14/16, allowing an adjustment of the supporting members 10/12 between the first stop 14 and the second stop 16. In this embodiment, if a feature of one of the fishing poles 30 (e.g., a fishing line guide) align with the supporting members 10/12, the supporting members 10/12 are relocatable to a position where the feature no longer interferes with the supporting members 10/12. In the example shown, three fishing poles 30 with reels 32 and fishing line 34 are shown for completeness. The supporting members 10/12 slidably interface with the connecting rod 18.

As in the first embodiment, to securely hold the fishing poles 30 to the support members 10/12, a securable band of material 22 removable secures around the circumference of each support member 10/12. In the preferred embodiment, the securable band of material 22 is made from cloth (e.g., nylon). One end of the securable band of material 22 is affixed to the circumference of each support member 10/12 and the loose end of the securable band of material 22 has hook and loop material on its inside surface, adapted to affix the loose end to matching hook and loop material on the outside surface of the securable band of material 22. In alternate embodiments, the loose end of the securable band of material 22 is removably affixed to itself by ways known in the industry including, but not limited to snaps, buckles, buttons, a sticky surface and clips. The supporting members 10/12 slidably interface with the connecting rod 18. In some embodiments, the supporting members 10/12 freely slide within a restricted area of the connecting rod 18 while in other embodiments, the supporting members 10/12 are fixed in position on a threaded portion of the connecting rod 18 by fasteners 16 such as nuts. In some embodiments, the supporting members 10/12 freely rotate on the connecting rod 18 while in other embodiments, supporting members 10/12 are kept from rotating on the connecting rod 18.

Referring to FIG. 2, an isometric view of a supporting member of all embodiments of the present invention will be described. In this example, the supporting member 10 has recesses 20 for holding up to three fishing poles 30. It is preferred that the recesses 20 be of greater diameter than the largest anticipated fishing pole 30. Nothing limits the recesses 20 from being of varying diameters and sizes. A hole 15 in the center accepts the connecting rod 18 for connection to a similar supporting member 12. In the example shown, the cloth strap 22/23 is attached to the supporting member 10 by means known in the industry including gluing, hot welding and the like.

Figure 3:
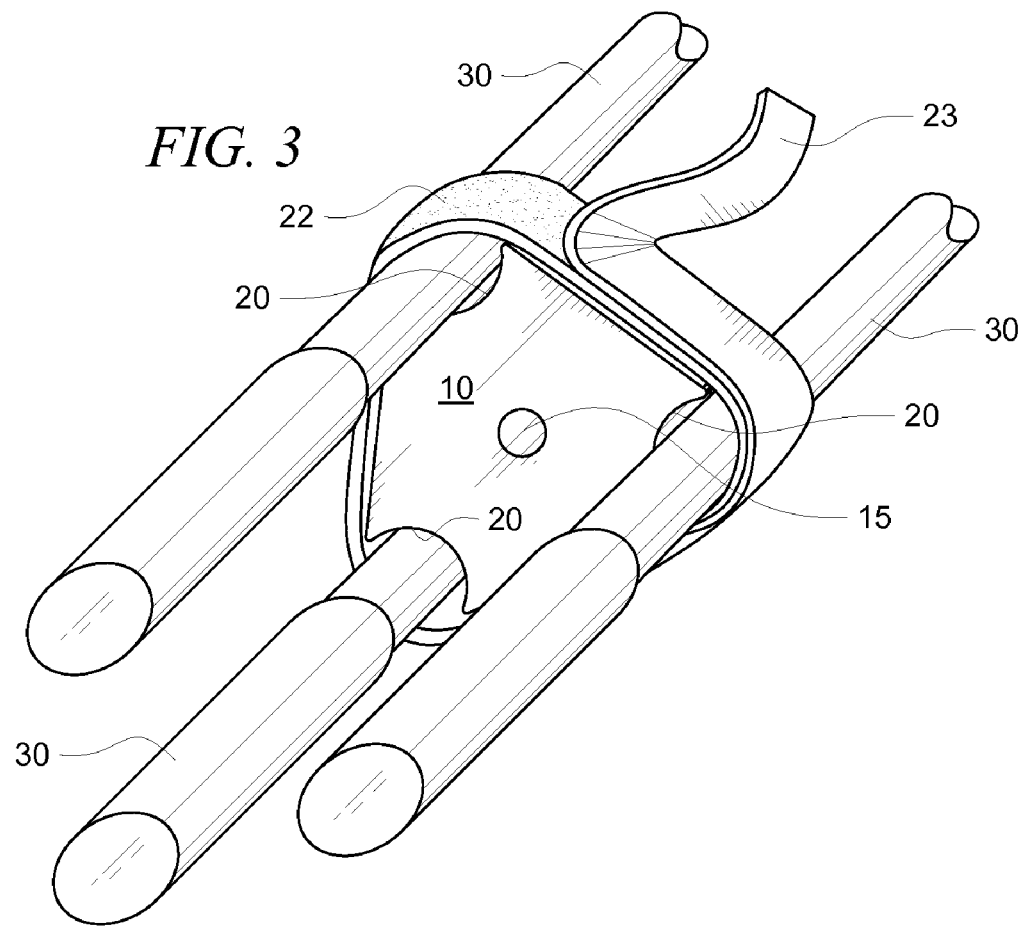
FIG. 3 illustrates an isometric view of a supporting member of all embodiments of the present invention engaged with a plurality of fishing poles.

Referring to FIG. 3, an isometric view of a supporting member of all embodiments of the present invention engaged with a plurality of fishing poles will be described. In this example, the supporting member 10 has recesses 20 that are holding three fishing poles 30 (any number greater than one is anticipated). It is preferred that the recesses 20 be of greater diameter than the largest anticipated fishing pole 30. Nothing limits the recesses 20 from being of varying diameters and sizes. A hole 15 in the center accepts the connecting rod 18 for connection to a similar supporting member 12. In the example shown, the cloth strap 22/23 is attached to the supporting member 10 by means known in the industry including gluing, hot welding and the like. In this example, the cloth strap 22/23 has hook and loop material on one side 22 and mating hook and loop material 23 on the other side allowing the strap 22/23 to be wrapped around the supporting member 20 and affixed to itself, holding the fishing poles 30 in place.

Figure 4A:
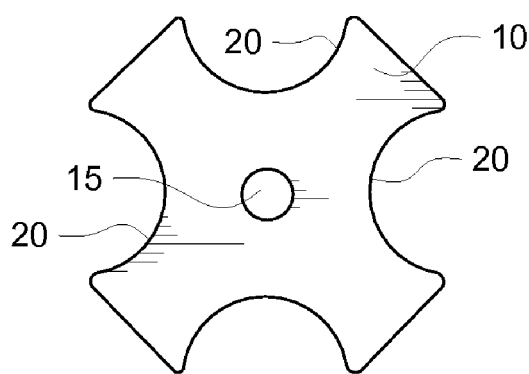
FIGS. 4A through 4E illustrate isometric views of alternate supporting members of all embodiments of the present invention.
Figure 4B:
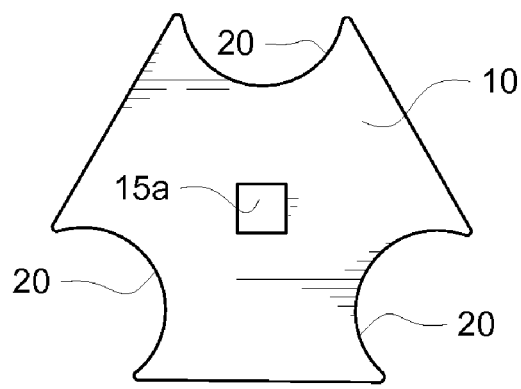
Figure 4C:
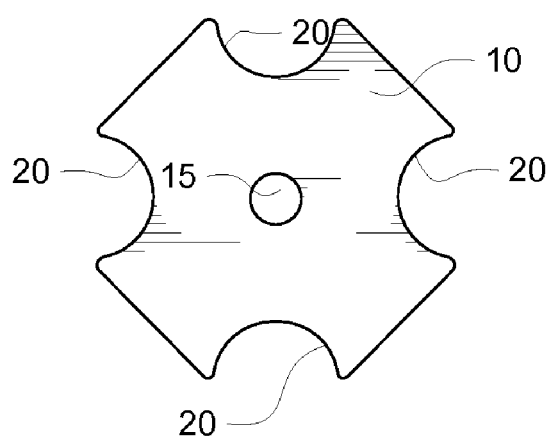
Figure 4D:
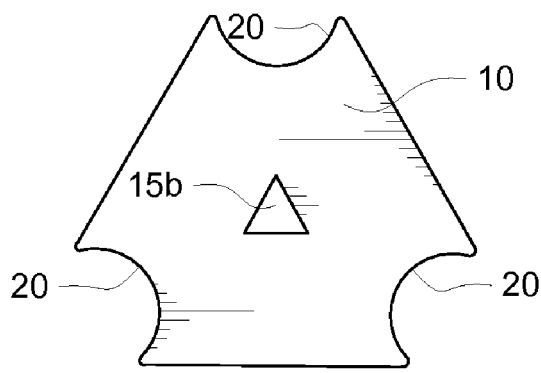
Figure 4E:
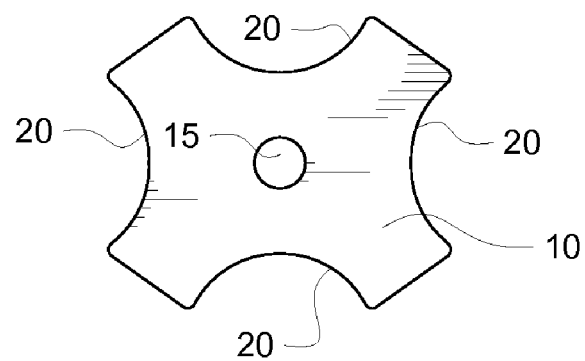

Referring to FIGS. 4A through 4E, isometric views of alternate supporting members of all embodiments of the present invention will be described. In these examples, different sizes and shapes of supporting members 10 are shown, though the present invention is not limited to any specific size, shape or configuration. FIGS. 4A, 4C and 4E show supporting members 10 with provisions for holding four fishing poles 30. FIGS. 4B and 4D show supporting members 10 with provisions for holding three fishing poles 30. Note that the supporting member 10 in FIG. 4B has a square attachment hole 15a for accepting a square connecting rod 18 and the supporting member 10 in FIG. 4B has a triangular attachment hole 15b for accepting a triangular connecting rod 18. The connecting rod 18 is of any cross-sectional shape and the attachment hole 15/15a/15b is shaped and sized to allow the connecting rod 18 to fit snuggly. By using a shape other than a circle (e.g., a square 15a or triangle 15b), the supporting members 10 are not allowed to twist with respect to each other on the connecting rod 18.

Figure 5:
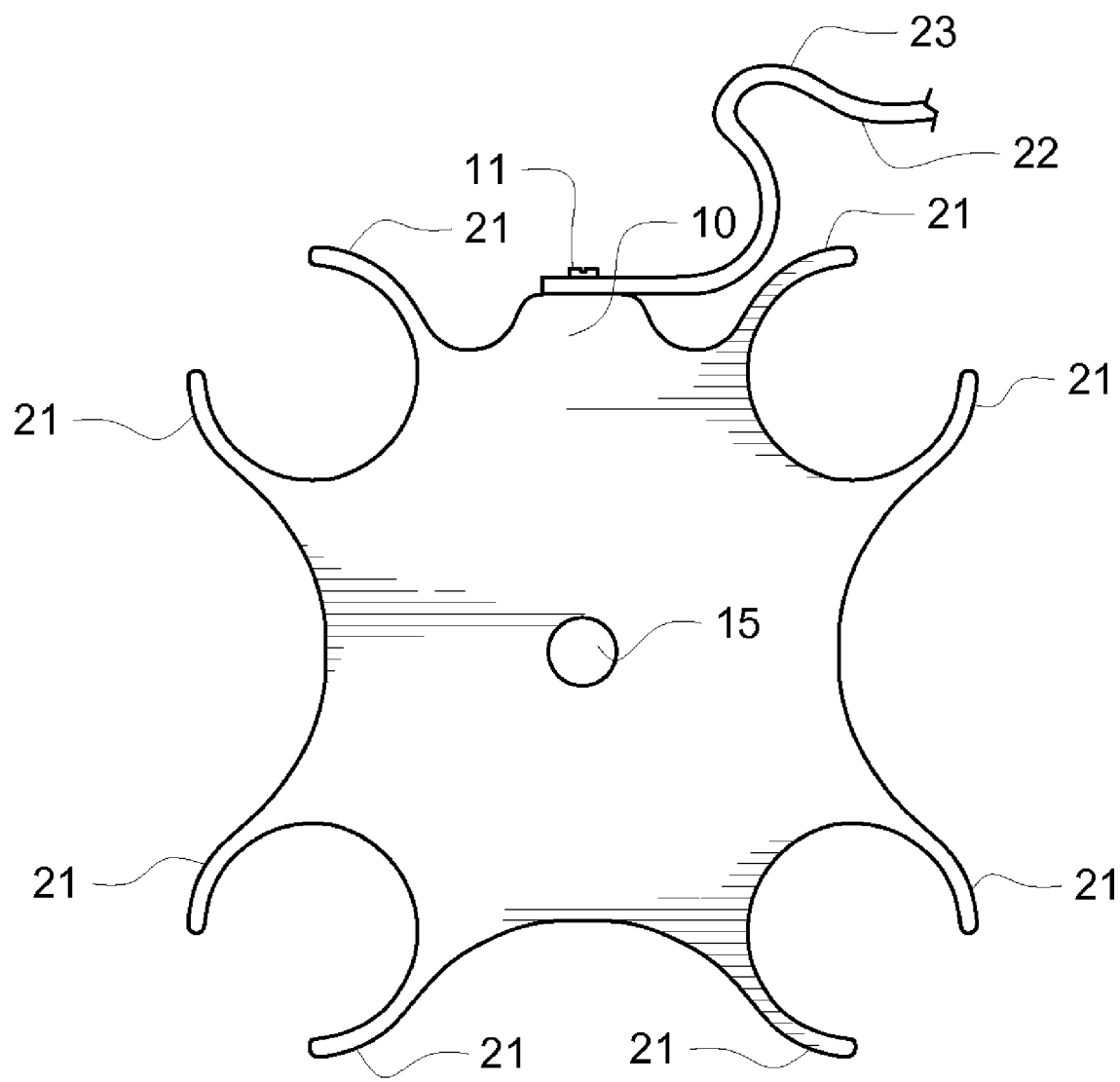
FIG. 5 illustrates a front view of another alternate supporting members of all embodiments of the present invention.
Figure 6:
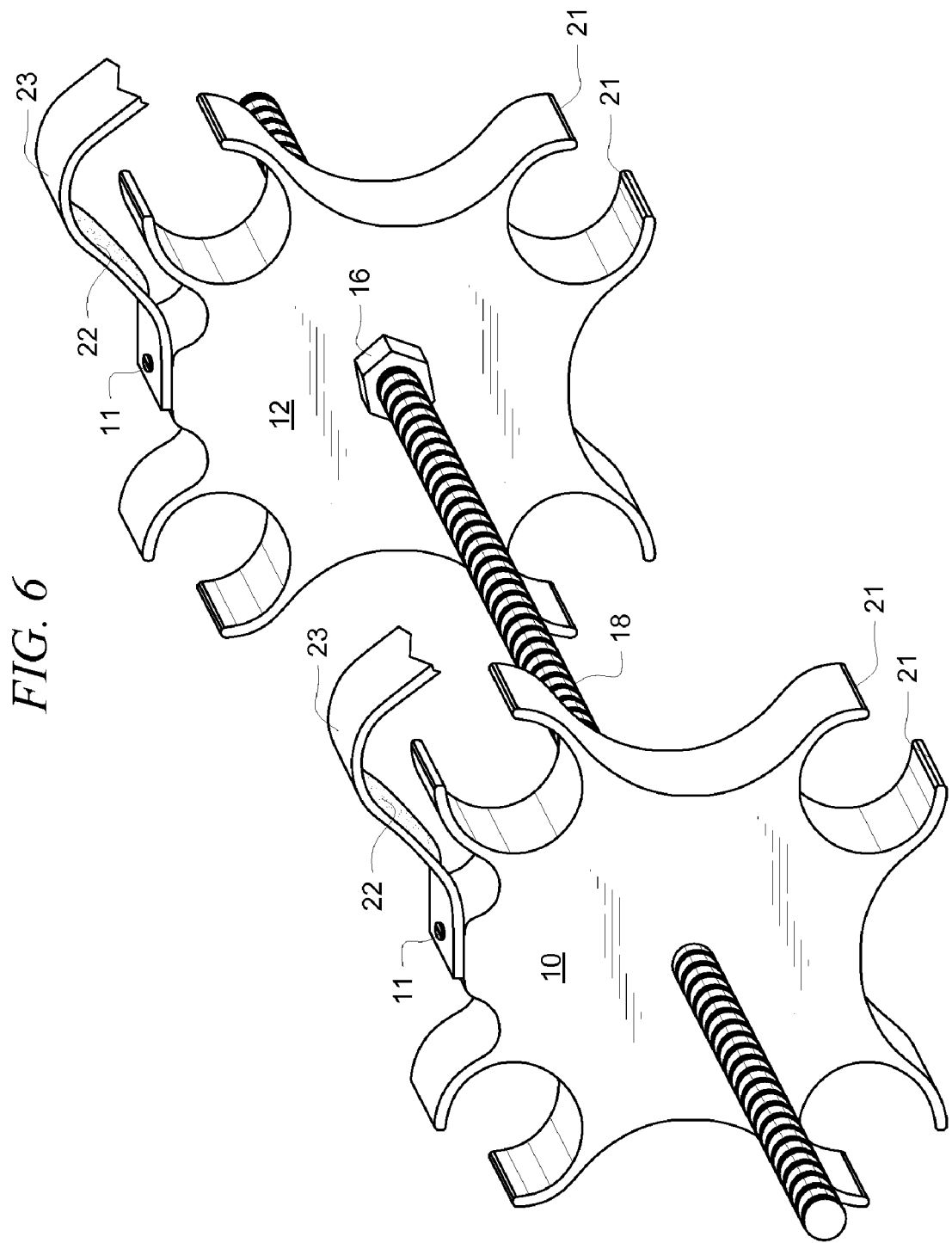
FIG. 6 illustrates an isometric view of the present invention.

Referring to FIG. 5, an front view of alternate supporting member of the present invention will be described. In this example, a supporting member 10 is shown with flexible flanges 21 for temporarily holding the fishing poles 30 until the securable band of material is wrapped around the supporting member 10 and fastened. The flexible flanges 21 a preferably sized to provide an opening slightly smaller than the diameter of the fishing poles 30 and, bend open slightly to accept the fishing poles 30 then restoring to their original spacing to temporarily hold the fishing poles 30. The present invention is not limited to any specific size, shape or configuration of recesses 20, flanges 21 and opening shape 15/15a/15b. In this embodiment, the supporting member 10 is preferably made from a stiff yet flexible plastic such as low density polypropylene (LDPE) and nylon.

Referring to FIG. 5, an isometric view of the present invention will be described. In this embodiment, the connecting rod is a threaded (or partially threaded) shaft 18. The front supporting member 10 has flanges 21 to temporarily hold the fishing poles 30 (not shown in this view) and a strap 23 with fastening material 22 on its bottom side, attached at one end to the front supporting member 10 by a screw 11 or other fastener. In some embodiments, the strap 23 is affixed to the front supporting member 10 by an adhesive or weld. The strap 23 is long enough to completely encircle the front supporting member 10 to positively hold the fishing poles 30 in the recesses formed by the flanges 21. The rear supporting member 12 has flanges 21 to temporarily hold the fishing poles 30 (not shown in this view) and a strap 23 with fastening material 22 on its bottom side, attached at one end to the front supporting member 10 by a screw 11 or other fastener. In some embodiments, the strap 23 is affixed to the rear supporting member 12 by an adhesive or weld. The strap 23 is long enough to completely encircle the rear supporting member 12 to positively hold the fishing poles 30 in the recesses formed by the flanges 21.

In this example, the front and rear supporting members 10/12 are threaded onto the shaft 18. In some embodiments, a nut of types known in the industry is integrated into each supporting member 10/12 to provide increased strength. Once the supporting members 10/12 are positioned to the desired position on the shaft 18, locking nuts 16 are tightened to keep the supporting members 10/12 in place and keep them from twisting.

In some embodiments, the supporting members 10/12 are of the same size and shape while in other embodiments, the front supporting member 10 has larger recesses than the supporting rear member 12. Although not required, it is preferred that the distance from the center of the supporting members to the edge of the recess 20 be such that the fishing poles 30 are held parallel to each other.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages.

The form herein before described being merely exemplary and explanatory embodiment thereof. It is the intention of the following claims to encompass and include such changes.

What is claimed is:

1. An apparatus for carrying multiple fishing poles, the apparatus comprising:
    a connecting rod having a first end and a distal second end;
    a first supporting member affixed near to the first end of the connecting rod;
    a second supporting member affixed near to the distal end of the connecting rod;
    a plurality of recesses in the supporting members, each of the recesses sized to accept one of the fishing poles;
    a first cloth strap affixed at one end to the first supporting member and adapted to removably cover the outer circumference of the first supporting member, thereby removably holding the fishing poles within the recesses of the first supporting member; and
    a second cloth strap affixed at one end to the second supporting member and adapted to removably cover the outer circumference of the second supporting member, thereby removably holding the fishing poles within the recesses of the second supporting member;
    wherein the first supporting member is slidably affixed near to a first end of the connecting rod between a first pair of stops, thereby allowing the first supporting member to move partially along the connecting rod between the first pair of stops.

2. The apparatus for carrying multiple fishing poles of claim 1, wherein the first cloth strap is removable by hook and loop material attached to a surface of the first cloth strap.

3. The apparatus for carrying multiple fishing poles of claim 1, wherein the second cloth strap is removable by hook and loop material attached to a surface of the second cloth strap.

4. The apparatus for carrying multiple fishing poles of claim 1, wherein the second supporting member is slidably affixed near to the second end of the connecting rod between a second pair of stops, thereby allowing the second supporting member to move partially along the connecting rod.

5. The apparatus for carrying multiple fishing poles of claim 1, wherein the first supporting member is affixed near to a first end of the connecting rod by at least one fastener, thereby keeping the first supporting member at a desired location along the connecting rod; and wherein the second supporting member is affixed near to the second end of the connecting rod by another at least one fastener, thereby keeping the second supporting member at a second desired location along the connecting rod.

6. The apparatus for carrying multiple fishing poles of claim 1, wherein the recesses have flanges to temporarily hold the fishing poles in place.

7. The apparatus for carrying multiple fishing poles of claim 1, wherein the first supporting member has four of said recesses and the second supporting member has four of said recesses.

8. The apparatus for carrying multiple fishing poles of claim 1, wherein the first and second supporting members are axially affixed to the connecting rod, thereby preventing rotation.

9. A method of carrying multiple fishing poles, the method comprising:
    providing an apparatus for carrying multiple fishing poles, the apparatus comprising:
        a connecting rod having a first end and a distal second end;

a first supporting member affixed near to the first end of the connecting rod;

a second supporting member affixed near to the distal end of the connecting rod;

a plurality of recesses in the supporting members, each of the recesses sized to accept one of the fishing poles;

a first cloth strap affixed at one end to the first supporting member and adapted to removably cover the outer circumference of the first supporting member, thereby removably holding the fishing poles within the recesses of the first supporting member; and a second cloth strap affixed at one end to the second supporting member and adapted to removably cover the outer circumference of the second supporting member, thereby removably holding the fishing poles within the recesses of the second supporting member;

wherein the first supporting member is slidably affixed near to a first end of the connecting rod between a first pair of stops, thereby allowing the first supporting member to move partially along the connecting rod;

adjusting the location of the first supporting member between a first pair of stops, thereby avoiding interference with fishing pole features;

placing at least one fishing pole into the recesses of the first supporting member and placing the at least one fishing pole into a corresponding recesses of the second supporting member;

affixing the first cloth strap around the first supporting member, thereby securing the at least one fishing pole to the first supporting member;

affixing the second cloth strap around the second supporting member, thereby securing the at least one fishing pole to the second supporting member; and carrying the at least one fishing pole by holding one of the at least one fishing poles.

10. The method of carrying multiple fishing poles of claim 9, wherein the first cloth strap is removable by hook and loop material attached to a surface of the first cloth strap.

11. The method of carrying multiple fishing poles of claim 9, wherein the second cloth strap is removable by hook and loop material attached to a surface of the second cloth strap.

12. The method of carrying multiple fishing poles of claim 9, wherein the a first supporting member is slidably affixed to a first end of the connecting rod between a first pair of stops, thereby allowing the first supporting member to move partially along the connecting rod.

13. The method of carrying multiple fishing poles of claim 9, wherein the a second supporting member is slidably affixed to the second end of the connecting rod between a second pair of stops, thereby allowing the second supporting member to move partially along the connecting rod.

14. The method of carrying multiple fishing poles of claim 9, wherein the first supporting member has four of said recesses and the second supporting member has four of said recesses.

15. An apparatus for carrying multiple fishing poles, the apparatus comprising:

a first means for transportably supporting at least one fishing pole, the first means for transportably supporting having a first plurality of recesses on a peripheral surface of the first means for transportably supporting and the first means for transportably supporting having a first means for removably securing the at least one fishing pole into the first plurality of recesses;

a second means for transportably supporting the at least one fishing pole, the second means for transportably supporting having a second plurality of recesses on a peripheral surface of the second means for transportably supporting and the second means for transportably supporting having a second means for removably securing the at least one fishing pole into the second plurality of recesses; and a means for connecting the first means for transportably supporting to the second means for transportably supporting;

a means for adjusting the location of the first means for transportably supporting at a position along an axis of the means for connecting, thereby avoiding interference with fishing pole features.

16. The apparatus for carrying multiple fishing poles of claim 15, wherein the first means for removably securing the at least one fishing pole is a first cloth strap affixed at a first end to the first means for transportably supporting and the first cloth strap having a first means for removably attaching a distal end of the first cloth strap to an outer surface of the first cloth strap.

17. The apparatus for carrying multiple fishing poles of claim 16, wherein the second means for removably securing the at least one fishing pole is a second cloth strap affixed at a first end to the second means for transportably supporting and the second cloth strap having a second means for removably attaching a distal end of the second cloth strap to an outer surface of the second cloth strap.

18. The apparatus for carrying multiple fishing poles of claim 17, wherein the first means for removably attaching a distal end of the first cloth strap to an outer surface of the first cloth strap includes hook and loop material and the second means for removably attaching a distal end of the first cloth strap to an outer surface of the first cloth strap also includes hook and loop material.

19. The apparatus for carrying multiple fishing poles of claim 17, wherein a means for connecting the first means for transportably supporting to the second means for transportably supporting is a rigid connecting rod.

* * * * *